US008451337B2

(12) United States Patent
Hirayama

(10) Patent No.: US 8,451,337 B2
(45) Date of Patent: May 28, 2013

(54) IMAGE STABILIZATION CONTROL CIRCUIT

(75) Inventor: Hideki Hirayama, Gifu (JP)

(73) Assignees: Sanyo Semiconductor Co., Ltd. (JP); Semiconductor Components Industries, LLC, Phoenix, AZ (US)

( * ) Notice: Subject to any disclaimer, the term of this patent is extended or adjusted under 35 U.S.C. 154(b) by 715 days.

(21) Appl. No.: 12/164,876

(22) Filed: Jun. 30, 2008

(65) Prior Publication Data
US 2009/0040320 A1 Feb. 12, 2009

(30) Foreign Application Priority Data
Aug. 9, 2007 (JP) .................................. 2007-208039

(51) Int. Cl.
*H04N 5/228* (2006.01)
*G03B 17/00* (2006.01)

(52) U.S. Cl.
USPC ............... 348/208.3; 348/208.99; 348/208.2; 348/208.4; 396/52; 396/53; 396/55

(58) Field of Classification Search ....................... None
See application file for complete search history.

(56) References Cited

U.S. PATENT DOCUMENTS

| 5,959,666 | A | 9/1999 | Naganuma |
| 7,557,831 | B2 | 7/2009 | Yamazaki |
| 7,899,314 | B2 * | 3/2011 | Kubo ............................. 396/55 |
| 2001/0012059 | A1 * | 8/2001 | Kudo ............................ 348/208 |
| 2004/0085464 | A1 * | 5/2004 | Higurashi et al. ............ 348/241 |
| 2005/0018051 | A1 * | 1/2005 | Tomita et al. ............. 348/208.4 |
| 2005/0128309 | A1 * | 6/2005 | Tomita et al. ............. 348/208.7 |
| 2006/0083502 | A1 * | 4/2006 | Higo .............................. 396/55 |
| 2006/0233539 | A1 * | 10/2006 | Kubo ............................. 396/55 |
| 2007/0166021 | A1 * | 7/2007 | Yamazaki ..................... 396/55 |
| 2009/0160952 | A1 * | 6/2009 | Nakakuki et al. .......... 348/208.4 |

FOREIGN PATENT DOCUMENTS

| JP | 6-339063 A | 12/1994 |
| JP | 8-307762 A | 11/1996 |
| JP | 83-07762 A | 11/1996 |

(Continued)

OTHER PUBLICATIONS

Chinese Office Action for Chinese Patent Application No. 200810128883.9 issued Aug. 14, 2009 with English translation.

(Continued)

*Primary Examiner* — Michael Osinski
(74) *Attorney, Agent, or Firm* — Cantor Colburn LLP

(57) ABSTRACT

An image stabilization control circuit controls an optical element driving element that moves an optical element provided in an imaging apparatus based on an output signal of a vibration detection element provided in the imaging apparatus. The image stabilization control circuit includes a high-pass filter that removes a low-frequency component from an output signal of the vibration detection element. A movement amount calculation circuit calculates a movement amount of the imaging apparatus based on an output signal of the high-pass filter. A servo circuit generates a correction signal for correcting the position of the optical element based on an output signal of the movement amount calculation circuit and outputs the correction signal to the optical element driving element. The movement amount calculation circuit includes a digital filter circuit and a register. The digital filter circuit performs filter processing based on a filter coefficient stored in the register.

4 Claims, 2 Drawing Sheets

FOREIGN PATENT DOCUMENTS

| | | | |
|---|---|---|---|
| JP | 10-213832 | A | 8/1998 |
| JP | 11-174520 | A | 7/1999 |
| JP | 11-231369 | A | 8/1999 |
| JP | 2000-350084 | A | 12/2000 |
| JP | 2003-234948 | A | 8/2003 |
| JP | 1598681 | A | 3/2005 |
| JP | 2007-101672 | A | 4/2007 |
| KR | 10-0423380 | B1 | 6/2004 |

OTHER PUBLICATIONS

Korean Office Action for Korean Patent Application No. 10-2008-61716 mailed Jan. 29, 2010 with English translation.

Japanese Office Action, Notice of Grounds for Rejection for Japanese Patent Application No. 2007-208039, drafted date of Apr. 4, 2012 with English translation.

* cited by examiner

IMAGE STABILIZATION CONTROL CIRCUIT

PRIORITY INFORMATION

This application claims priority to Japanese Patent Application No. 2007-208039, filed on Aug. 9, 2007, which is incorporated herein by reference in its entirety.

BACKGROUND OF THE INVENTION

1. Field of the Invention

The present invention relates to an image stabilization control circuit provided in an imaging apparatus (e.g., a digital still camera), which can prevent a captured image from being blurred when the imaging apparatus moves or vibrates (camera shake).

2. Description of the Related Art

Recent imaging apparatuses, such as digital still cameras and digital video cameras, are equipped with a high-resolution image sensor having a large number of pixels and capable of capturing a high-quality image. However, if a user's hand holding an imaging apparatus vibrates in a shooting operation, a captured image is blurred. Therefore, to obtain a high-quality image, it is desired that an imaging apparatus has a camera-shake correction function.

More specifically, an imaging apparatus includes a detection element (e.g., gyro sensor) that detects an angular speed caused when the imaging apparatus vibrates. The imaging apparatus drives an optical element (e.g., a lens or an image sensor) according to a detected angular speed component so as to prevent a captured image from being blurred. Thus, even when the imaging apparatus vibrates, a captured still/moving image signal does not include any vibration component and therefore the imaging apparatus can obtain high-quality still/moving image signal free from blur.

FIG. 2 is a block diagram illustrating a conventional image stabilization control circuit 100 that has a camera-shake correction function. The image stabilization control circuit 100 is provided in an imaging apparatus and operates under the control of a main control circuit (not illustrated) provided in the imaging apparatus. The image stabilization control circuit 100 is connected to a position detection element 200, a lens driving element 300, and a vibration detection element 400.

The position detection element 200 detects the position of a lens provided in the imaging apparatus. For example, the position detection element 200 is a Hall element that generates induced current according to the absolute position of the lens and outputs a voltage signal.

The lens driving element 300 moves the lens according to a lens driving signal generated by the image stabilization control circuit 100. For example, the lens driving element 300 is a voice coil motor. The image stabilization control circuit 100 adjusts a voltage value applied to the lens driving element 300 (i.e., voice coil motor) and controls the position of a movable coil in the voice coil motor. In other words, the image stabilization control circuit 100 adjusts the position of the lens. The lens driving element 300 moves the lens on a plane perpendicular to an optical axis of the imaging apparatus.

The vibration detection element 400 detects vibration occurring in the imaging apparatus and outputs a detection signal to the image stabilization control circuit 100. For example, the vibration detection element 400 is a gyro sensor that can generate an angular speed signal corresponding to the vibration occurring in the imaging apparatus and outputs the generated angular speed signal to the image stabilization control circuit 100.

It is desired to provide at least two elements for each of the position detection element 200, the lens driving element 300, and the vibration detection element 400. Two or more elements corresponding to a horizontal component and a vertical component can be positioned on a plane perpendicular to the optical axis of the imaging apparatus for lens position detection, lens movement detection, and vibration detection of the imaging apparatus.

The image stabilization control circuit 100 includes a servo circuit 120, a lens driver 140, an analog-digital converter (ADC) 142, a central processing unit (CPU) 160, and a digital-analog converter (DAC) 162.

The servo circuit 120 generates a control signal supplied to the lens driving element 300 according to a voltage signal received from the position detection element 200. The servo circuit 120 includes an analog filter circuit associated with external electrical parts (e.g., a resistance element and a capacitor). The servo circuit 120 generates a control signal supplied to the lens driving element 300 so that the optical axis of the lens accords with the center of the image sensor provided in the imaging apparatus. The lens driver 140 generates a lens driving signal supplied to the lens driving element 300 based on an output signal of the servo circuit 120.

The ADC 142 receives an angular speed signal (an analog signal) from the vibration detection element 400 and converts the input analog signal into a digital signal. The CPU 160 receives an angular speed signal (a digital signal) from the ADC 142 and generates an angular signal indicating a movement amount of the imaging apparatus based on the input signal. The CPU 160 is connected to a memory (not illustrated) and performs angular signal generation processing based on a software program stored in the memory. The DAC 162 converts an angular signal (a digital signal) generated by the CPU 160 into an analog signal.

The servo circuit 120 generates a lens driving signal supplied to the lens driving element 300 based on a sum of an analog angular signal received from the DAC 162 and a voltage signal received from the position detection element 200. In other words, to eliminate any blur on an image caused by camera shake, the servo circuit 120 changes the position of the lens based on an angular signal indicating a movement amount of the imaging apparatus and enables the image sensor to capture an object image not including any blur. Thus, the imaging apparatus can obtain high-quality still/moving image signal while suppressing blur on a captured image caused by camera shake.

The conventional image stabilization control circuit 100 illustrated in FIG. 2 receives an angular speed signal obtained by the vibration detection element 400 and generates an angular signal indicating a movement amount of an imaging apparatus. To this end, the CPU 160 executes a software program that realizes the above-described functions. In this case, the image stabilization control circuit 100 is required to quickly accomplish the processing. The CPU 160 operates with a high-speed clock. For example, when an imaging apparatus obtains a moving image consisting of 30 frames during a shooting operation of one second, the position of the lens is controlled at a resolution faster than 1/30 second.

The CPU 160, if operating with a high-speed clock, increases power consumption in the image stabilization control circuit 100. An imaging apparatus has a power source such as a secondary battery (e.g., lithium-ion battery) that drives the image stabilization control circuit 100. If power consumption in the image stabilization control circuit 100 increases, the residual capacity of the secondary battery quickly decreases and the operable time of the imaging apparatus becomes shorter. The shooting time for a moving image becomes shorter. The maximum number of still images that a user of the imaging apparatus can take becomes smaller. The camera-shake correction function of an imaging apparatus is active not only during a shooting operation of a moving image or a still image but also in a preview operation (shooting preparation). Therefore, it is desired to reduce power consumption required for the camera-shake correction function.

SUMMARY OF THE INVENTION

An exemplary embodiment of the present invention solves the above-described problems and provides an image stabilization control circuit capable of obtaining a high-quality still/moving signal while reducing power consumption.

According to an aspect of the present invention, an image stabilization control apparatus includes a vibration detection element configured to detect vibration of an imaging apparatus, a high-pass filter configured to remove a low-frequency component from an output signal of the vibration detection element, a movement amount calculation circuit configured to calculate a movement amount of the imaging apparatus based on an output signal of the high-pass filter, and a servo circuit configured to generate a correction signal for correcting the position of an optical element based on an output signal of the movement amount calculation circuit and output the correction signal to an optical element driving element. The movement amount calculation circuit includes a digital filter circuit and a register. The digital filter circuit performs filter processing based on a filter coefficient stored in the register. The movement amount calculation circuit controls the optical element driving element that is configured to move the optical element provided in the imaging apparatus based on an output signal of the vibration detection element.

BRIEF DESCRIPTION OF THE DRAWINGS

A preferred embodiment of the present invention will be described in detail based on the following figures, wherein.

DESCRIPTION OF PREFERRED EMBODIMENTS

Figure 1:
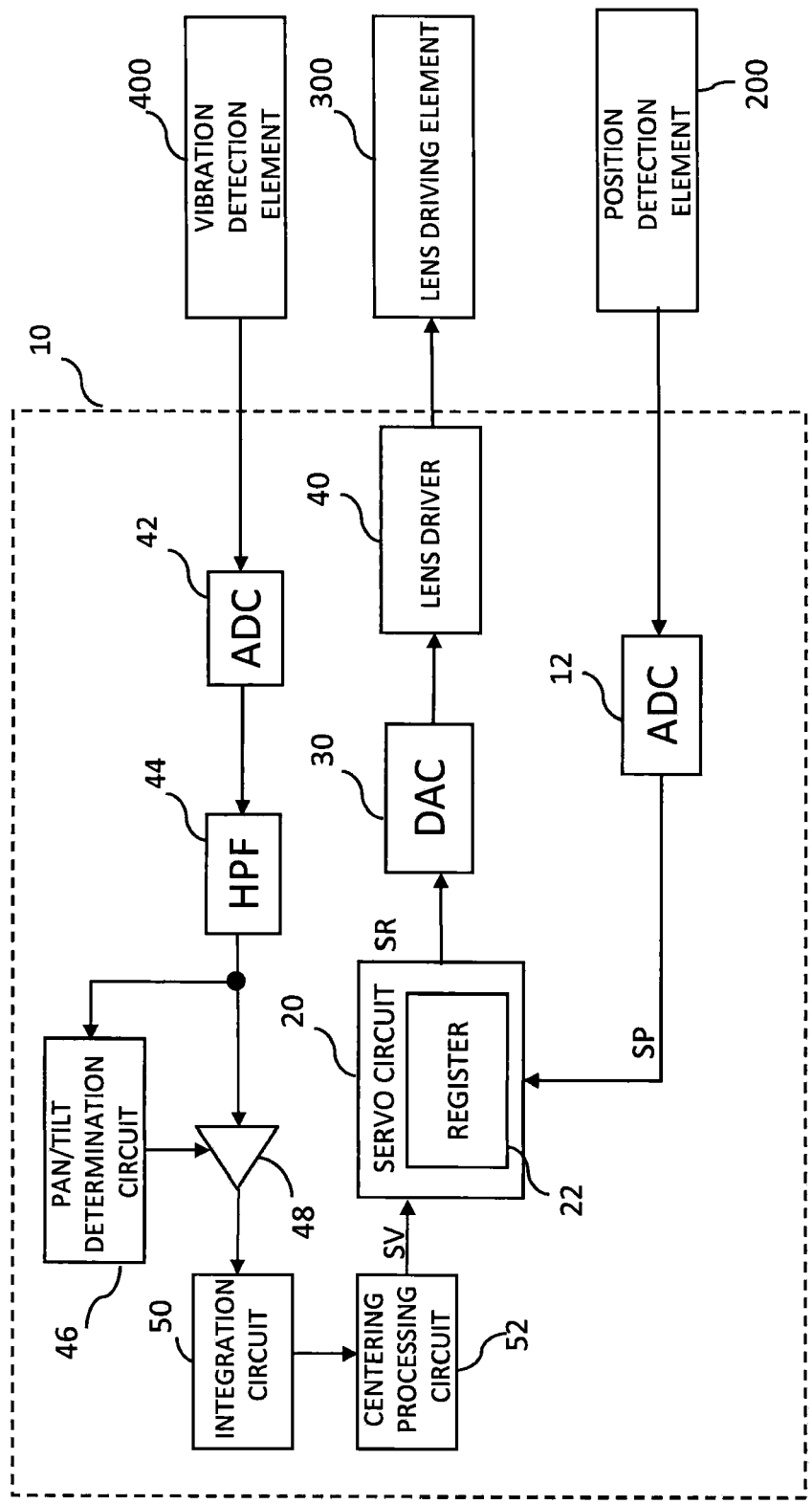
FIG. 1 is a block diagram illustrating an image stabilization control circuit according to an embodiment of the present invention.

FIG. 1 is a block diagram illustrating an image stabilization control circuit 10 according to an embodiment of the present invention. The image stabilization control circuit 10 includes two analog-digital converters (ADCs) 12 and 42, a servo circuit 20, a lens driver 40, a high-pass filter (HPF) 44, a pan/tilt determination circuit 46, a gain adjustment circuit 48, an integration circuit 50, and a centering processing circuit 52. The image stabilization control circuit 10 is connected to a position detection element 200, a lens driving element 300, and a vibration detection element 400, which are similar to those described in FIG. 2.

The ADC 12 receives an analog voltage signal from the position detection element 200 (e.g., a Hall element) and converts the input analog signal into a digital signal. The Hall element generates induced current corresponding to magnetic force of a magnet fixed to a lens. More specifically, the Hall element generates a voltage signal indicating the position of the lens based on a distance between the Hall element and the lens. The ADC 12 outputs a position signal SP as a digital signal converted from the voltage signal received from the Hall element. The ADC 12 is configured to output a reference signal (e.g., a digital value indicating "0") when the optical axis of the lens accords with the center of an image sensor provided in the imaging apparatus.

The servo circuit 20 receives the position signal SP from the ADC 12 and a vibration component signal SV from a later-described centering processing circuit 52, and generates a correction signal SR based on a sum of the position signal SP and the vibration component signal SV for controlling driving of the lens driving element 300. The servo circuit 20 includes a register 22 and a digital filter circuit (not illustrated) and performs filter processing based on a filter coefficient stored in the register 22.

A digital-analog converter (DAC) 30 receives a correction signal SR (a digital signal) from the servo circuit 20 and converts the correction signal SR into an analog signal. The lens driver 40 generates a lens driving signal based on the correction signal SR (an analog signal) for driving the lens driving element 300.

The ADC 42 receives an analog angular speed signal from the vibration detection element 400 (e.g., a gyro sensor) and converts the input analog signal into a digital signal. The HPF 44 removes a direct-current component from the angular speed signal and extracts a high-frequency component from the angular speed signal that reflects vibration of the imaging apparatus.

The pan/tilt determination circuit 46 receives an angular speed signal from the HPF 44 and detects a panning operation or a tilting operation of the imaging apparatus based on the input signal. "Panning" is an operation for moving the imaging apparatus in the horizontal direction to follow a moving object to be shot. On the other hand, "tilting" is an operation for moving the imaging apparatus in a vertical direction.

When the imaging apparatus changes a shooting range according to movement of an object to be shot, the vibration detection element 400 generates an angular speed signal corresponding to the movement. However, a variation in the angular speed signal caused by a panning operation or a tilting operation is unrelated to camera shake. Therefore, correcting an optical system (including a lens) is unnecessary. The pan/tilt determination circuit 46 is configured to realize such a control. More specifically, the pan/tilt determination circuit 46 determines that a panning operation or a tilting operation is currently being performed if the angular speed signal continuously exceeds a predetermined value for a predetermined duration.

The gain adjustment circuit 48 changes an amplification rate of the angular speed signal received from the HPF 44 based on a determination result received from the pan/tilt determination circuit 46. For example, if the imaging apparatus does not perform a panning operation or a tilting operation, the gain adjustment circuit 48 maintains the intensity of an angular speed signal generated from the HPF 44 at the same level. If the imaging apparatus performs a panning operation or a tilting operation, the gain adjustment circuit 48 decreases the intensity of the angular speed signal generated from the HPF 44 to 0.

The integration circuit 50 integrates an angular speed signal received from the gain adjustment circuit 48 and generates an angular signal indicating a movement amount of the imaging apparatus. The integration circuit 50, including a digital filter (not illustrated), performs filter processing based on a filter coefficient stored in a register (not illustrated) to obtain an angular signal (i.e., a movement amount of the imaging apparatus).

The centering processing circuit 52 subtracts a predetermined value from the angular signal received from the integration circuit 50 and generates the vibration component signal SV indicating a movement amount of the imaging apparatus. If the imaging apparatus continuously performs camera-shake correction processing, the position of the adjusted lens may gradually deviate from a reference position and approach the limit point of a movable range of the lens. In this case, if the imaging apparatus continues the camera-shake correction processing, the imaging apparatus is brought into a condition where the lens cannot move in an intended direction although the lens can move in the opposite direction. To solve this problem, the centering processing circuit 52 prevents the lens from approaching the limit point of the movable range by subtracting a predetermined value from the angular signal.

The centering processing circuit 52 can include a digital filter (not illustrated) that performs processing for subtracting a predetermined value from the angular signal by performing filter processing based on a filter coefficient stored in a register (not illustrated).

The image stabilization control circuit 10 illustrated in FIG. 1 performs lens movement control capable of correcting camera shake that causes a blur on a captured image.

First, it is now assumed that a captured image does not include any blur caused by camera shake. The optical axis of the lens driven by the lens driving element 300 accords with the center of the image sensor provided in the imaging apparatus. Therefore, the ADC 12 outputs a digital position signal SP indicating a value of "0." When the position signal SP has a value of "0", the servo circuit 20 outputs a correction signal SR for controlling the lens driving element 300 so as to maintain the present lens position.

If the optical axis of the lens disaccords with the center of the image sensor, the ADC 12 outputs a digital position signal SP having a value different from "0." The servo circuit 20 outputs a correction signal SR according to an output value of the ADC 12 for controlling the lens driving element 300 so that the position signal SP has a value of "0." The servo circuit 20 controls the lens position by repeating the above-described operation to equalize the optical axis of the lens with the center of the image sensor.

Next, it is assumed that a captured image is blurred because of camera shake in a shooting operation. The optical axis of the lens driven by the lens driving element 300 accords with the center of the image sensor provided in the imaging apparatus. Therefore, the ADC 12 outputs a digital position signal SP indicating a value of "0." Meanwhile, the imaging apparatus moves due to camera shake. Therefore, the integration circuit 50 and the centering processing circuit 52 output an angular signal indicating a movement amount of the imaging apparatus based on an angular speed signal generated by the vibration detection element 400.

The servo circuit 20 generates a correction signal SR based on a sum of the position signal SP indicating "0" received from the ADC 12 and an angular signal received from the centering processing circuit 52. In this case, even if the position signal SP is "0", an angular signal not indicating "0" is added. Therefore, the servo circuit 20 generates a correction signal SR for moving the lens, and the lens driving element 300 moves the lens based on the correction signal SR generated by the servo circuit 20. Therefore, the image sensor provided in the imaging apparatus can obtain an image signal that does not include any component corresponding to blur (camera shake) when the imaging apparatus vibrates in a shooting operation. The image stabilization control circuit 10 repeats the above-described control to realize camera-shake correction control.

As described above, an embodiment of the present invention uses the HPF 44, the integration circuit 50, and the centering processing circuit 52 to generate an angular signal indicating a movement amount of the imaging apparatus based on an angular speed signal obtained from the vibration detection element 400. Therefore, the embodiment can generate an angular signal without using any computer (e.g., CPU) and can reduce power consumption in the image stabilization control circuit 10.

Furthermore, compared to a circuit arrangement including a CPU, the image stabilization control circuit 10 according to an embodiment of the present invention can use a compact circuit having a smaller area because the function of the CPU can be realized by the HPF 44, the integration circuit 50, and the centering processing circuit 52. Therefore, the embodiment of the present invention can reduce the cost for a semiconductor chip mounting the image stabilization control circuit 10.

An embodiment of the present invention can provide a simplified circuit configuration for the image stabilization control circuit 10, according to which each of the servo circuit 20, the HPF 44, the integration circuit 50, and the centering processing circuit 52 includes a digital filter circuit.

Figure 2:
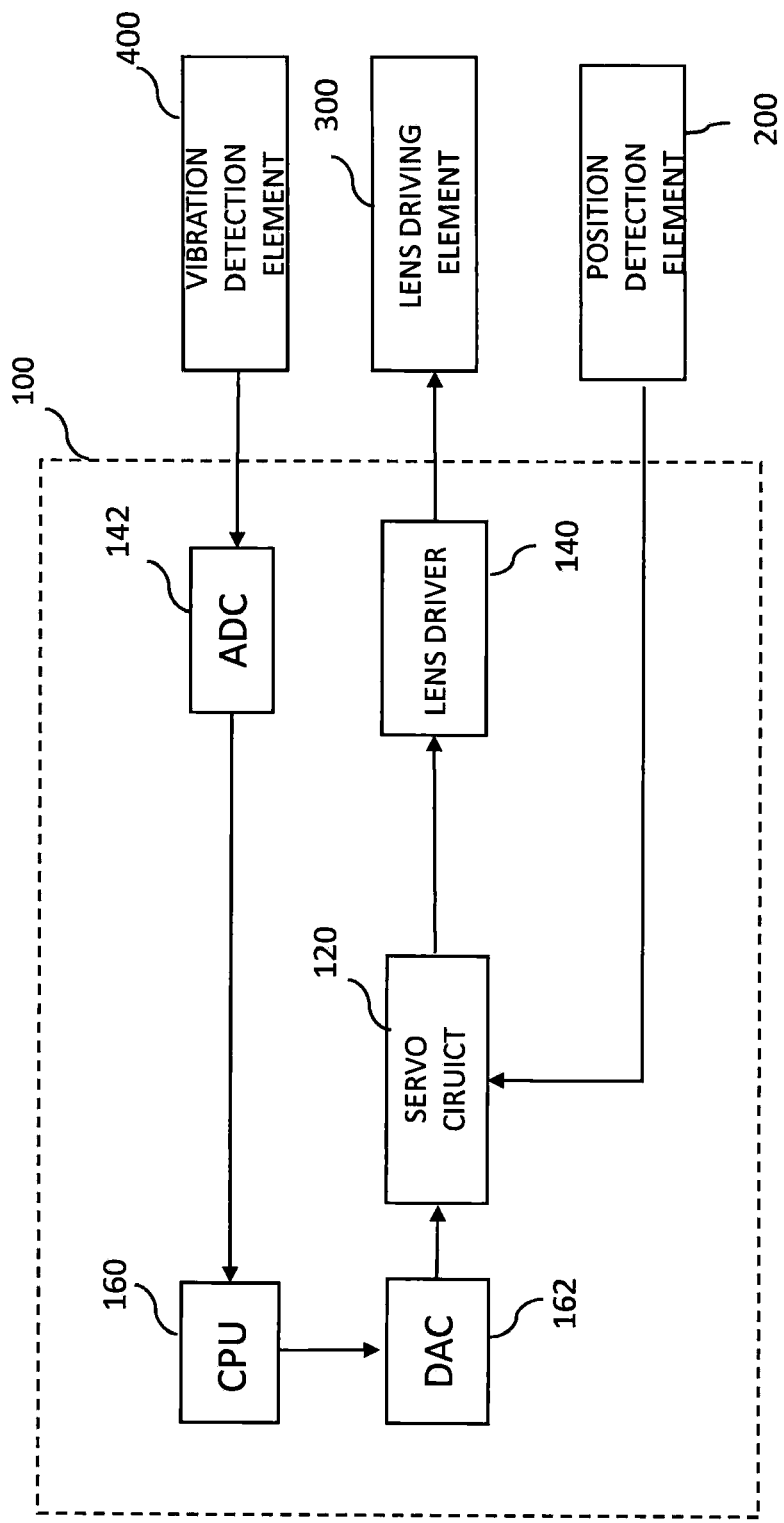
FIG. 2 is a block diagram illustrating a conventional image stabilization control circuit.

According to the conventional image stabilization control circuit 100 illustrated in FIG. 2, the servo circuit 120 includes an analog filter circuit. Therefore, the servo circuit 120 requires external electrical parts (e.g., a resistance element and a capacitor). To change the control characteristics of the conventional image stabilization control circuit 100, it is generally necessary to adjust the filter coefficient of the servo circuit 120. However, the filter coefficient cannot be changed unless the associated external electrical parts are replaced. Therefore, changing the filter coefficient is not easy.

However, the image stabilization control circuit 10 described in FIG. 1 according to the present invention can easily change a filter coefficient by changing a filter coefficient value stored in the register 22. Thus, an embodiment of the present invention can easily adjust control characteristics of the image stabilization control circuit 10.

As described above, according to an embodiment of the present invention, the position detection element 200 can be constituted by a Hall element. The lens driving element 300 can be constituted by a voice coil motor. Also, the vibration detection element 400 can be constituted by a gyro sensor. However, according to another embodiment of the present invention, the lens driving element 300 can be constituted by a stepping motor or a piezoelectric element. When the lens driving element 300 is a stepping motor, the stepping motor can function as the position detection element 200 because a control signal supplied to the stepping motor can be used as a signal indicating the position of a lens. Furthermore, the vibration detection element 400 can be configured to detect vibration of an imaging apparatus based on an acceleration signal obtained by a sensor capable of detecting acceleration in a linear direction.

As described above, an embodiment of the present invention can be applied to a lens shift-type image stabilization control circuit that moves a lens to perform camera-shake correction processing. Another exemplary embodiment of the present invention can be applied to a charge coupled device (CCD) shift-type image stabilization control circuit that moves a CCD element (image sensor) according to vibration of an imaging apparatus. In this case, the position detection element 200 detects the position of the image sensor and the lens driving element 300 (i.e., an optical element driving element defined in the following claims) can be configured as an element driving the image sensor.

What is claimed is:

1. An image stabilization control circuit, comprising:
an analog-digital conversion circuit configured to convert an analog signal output by a gyro sensor to a digital signal;
a high-pass filter configured to remove a low-frequency component from a signal output by the analog-digital conversion circuit;
a movement amount calculation circuit configured to calculate a movement amount of an imaging apparatus based on an output signal of the high-pass filter;
a centering processing circuit configured to subtract a predetermined value from the movement amount output from the movement amount calculation circuit so as to prevent an optical element from approaching a limit point of a movable range, and output a result signal to a servo circuit;
a servo circuit configured to generate a correction signal for correcting a position of the optical element based on the output result signal of the centering processing circuit and output the correction signal to an optical element driving element;
a pan/tilt determination circuit configured to compare an output signal of the high-pass filter with a predetermined threshold and determine whether a panning operation or a tilting operation is performed based on a result of comparison; and
an amplification circuit configured to amplify the output signal of the high-pass filter and change an amplification rate according to the result determined by the pan/tilt determination circuit, and
wherein each of the high-pass filter, the movement amount calculation circuit, the centering processing circuit, the pan/tilt determination circuit, and the amplification circuit is implemented not by a microcomputer but by a logic circuit and includes a digital filter circuit and a register;
the digital filter circuit performs filter processing based on a filter coefficient stored in the register; and
the optical element provided in the imaging apparatus is moved based on the output signal of the gyro sensor provided in the imaging apparatus.

2. The image stabilization control circuit according to claim 1, wherein the servo circuit generates the correction signal based on a sum of an output signal of a position detection element configured to detect the position of the optical element and an output signal of the movement amount calculation circuit.

3. The image stabilization control circuit according to claim 2, wherein the servo circuit includes a digital filter circuit and a register, and the digital filter circuit performs filter processing based on a filter coefficient stored in the register.

4. An imaging apparatus comprising:
a gyro sensor configured to detect vibration of an imaging apparatus;
an optical element;
a position detection element configured to detect a position of the optical element;
an optical element driving element configured to drive the optical element; and
an image stabilization control circuit configured to control the optical element driving element based on an output signal of the gyro sensor,
wherein the image stabilization control circuit comprises:
an analog-digital conversion circuit configured to convert an analog signal output by the gyro sensor to a digital signal;
a high-pass filter configured to remove a low-frequency component from an output signal of the analog-digital conversion circuit;
a movement amount calculation circuit configured to calculate a movement amount of the imaging apparatus based on an output signal of the high-pass filter;
a centering processing circuit configured to subtract a predetermined value from the movement amount output from the movement amount calculation circuit so as to prevent an optical element from approaching a limit point of a movable range, and output a result signal to a servo circuit; and
a servo circuit configured to generate a correction signal for correcting the position of the optical element based on the output result signal of the centering processing circuit and output the correction signal to the optical element driving element;
a pan/tilt determination circuit configured to compare an output signal of the high-pass filter with a predetermined threshold and determine whether a panning operation or a tilting operation is performed based on a result of comparison; and
an amplification circuit configured to amplify the output signal of the high-pass filter; and
wherein each of the high-pass filter, the movement amount calculation circuit, the centering processing circuit, the pan/tilt determination circuit, and the amplification circuit is implemented not by a microcomputer but by a logic circuit and includes a digital filter circuit and a register, and the digital filter circuit performs filter processing based on a filter coefficient stored in the register;
the optical element provided in the imaging apparatus is moved based on the output signal of the gyro sensor provided in the imaging apparatus, and
the amplification circuit is configured to change an amplification rate according to the result determined by the pan/tilt determination circuit.

* * * * *